US011949681B2

(12) United States Patent
Lu et al.

(10) Patent No.: US 11,949,681 B2
(45) Date of Patent: Apr. 2, 2024

(54) AUTHENTICATION AND AUTHORIZATION FOR CLOUD FILE SYSTEM (71) Applicant: Alibaba Group Holding Limited, Grand Cayman (KY)

(72) Inventors: Qingda Lu, Bellevue, WA (US); Junpu Chen, Redmond, WA (US); Qinghua Ye, Sammamish, WA (US); Lei Wang, Hangzhou (CN); Zhiyong Lin, Hangzhou (CN); Liping Bao, Sammamish, WA (US); Jiesheng Wu, Redmond, WA (US); Li Xu, Hangzhou (CN); Xiaohui Pei, Hangzhou (CN); Feng Zhang, Shanghai (CN); Leilei Tian, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 457 days.

(21) Appl. No.: 17/284,340

(22) PCT Filed: Oct. 10, 2018

(86) PCT No.: PCT/CN2018/109647
§ 371 (c)(1),
(2) Date: Apr. 9, 2021

(87) PCT Pub. No.: WO2020/073230
PCT Pub. Date: Apr. 16, 2020

(65) Prior Publication Data
US 2021/0377273 A1    Dec. 2, 2021

(51) Int. Cl.
*H04L 9/40* (2022.01)
(52) U.S. Cl.
CPC .......... *H04L 63/102* (2013.01); *H04L 63/083* (2013.01)

(58) Field of Classification Search
CPC ..... H04L 63/102; H04L 63/083; H04L 63/20; H04L 63/0807; H04L 67/1097; H04L 69/163
See application file for complete search history.

(56) References Cited

U.S. PATENT DOCUMENTS 8,352,941 B1 * 1/2013 Protopopov .......... H04L 63/102
                                                            718/1
8,745,384 B2    6/2014 Persaud et al.
(Continued)

FOREIGN PATENT DOCUMENTS

EP    3355183 A1    8/2018

OTHER PUBLICATIONS

Extended European Search Report dated Apr. 13, 2022 for European Patent Application No. 18936559.6, 9 pages.
(Continued)

*Primary Examiner* — J. Brant Murphy
(74) *Attorney, Agent, or Firm* — Lee & Hayes P.C.

(57) ABSTRACT

Methods and systems are provided for improving user authentication and access control by a network file system service in a multi-tenant public cloud environment by receiving a request for a connection to a file system from a file system client (client), sending an identification request for identification authentication of the client to a control system, receiving a response from the control system, establishing the connection to the file system upon determining that the connection to the file system is allowed based on cloud tenant information associated with the client, receiving an attempt to access the file system from the client by a sub-user, authenticating the sub-user based on the cloud tenant information, issuing a security token including a globally unique sub-user identifier of the sub-user, and using (Continued)

the security token to determine access rights of the sub-user to the file system for a subsequent request.

17 Claims, 7 Drawing Sheets

(56) References Cited

U.S. PATENT DOCUMENTS

| | | | |
|---|---|---|---|
| 9,191,384 B2 | 11/2015 | Stewart et al. | |
| 9,646,019 B2 | 5/2017 | Factor et al. | |
| 9,774,586 B1* | 9/2017 | Roche | H04L 63/08 |
| 9,992,186 B1* | 6/2018 | Drozd | H04L 63/102 |
| 10,009,337 B1* | 6/2018 | Fischer | H04L 67/1097 |
| 10,044,723 B1* | 8/2018 | Fischer | H04L 63/102 |
| 10,762,230 B2 | 9/2020 | Ancin et al. | |
| 11,094,023 B2 | 8/2021 | Coronel et al. | |
| 2013/0042106 A1* | 2/2013 | Persaud | G06F 21/606 |
| | | | 713/165 |
| 2013/0111558 A1* | 5/2013 | Sangubhatla | H04L 63/102 |
| | | | 726/4 |
| 2015/0007263 A1* | 1/2015 | Stewart | H04L 63/0815 |
| | | | 726/3 |
| 2015/0163158 A1* | 6/2015 | Ryland | H04L 41/0893 |
| | | | 709/225 |
| 2016/0028833 A1* | 1/2016 | Georgieva | H04L 67/146 |
| | | | 709/228 |
| 2016/0212120 A1* | 7/2016 | Bryant | G06F 16/176 |
| 2016/0259807 A1* | 9/2016 | Factor | G06F 9/00 |
| 2018/0247074 A1* | 8/2018 | Ancin | G06F 21/62 |
| 2019/0109852 A1* | 4/2019 | Ranganathan | G06F 21/6218 |
| 2020/0143493 A1* | 5/2020 | Coronel | H04W 12/08 |

OTHER PUBLICATIONS

English translation of International Search Report dated Jul. 22, 2019, from corresponding CN PCT Application No. PCT/CN2018/109647, 3 pages.

English translation of Written Opinion dated Jul. 22, 2019, from corresponding CN PCT Application No. PCT/CN2018/109647, 4 pages.

* cited by examiner

AUTHENTICATION AND AUTHORIZATION FOR CLOUD FILE SYSTEM

This Application claims priority to and is a national stage application, filed under 35 U.S.C. § 371, of International Patent Application No. PCT/CN2018/109647, filed on Oct. 10, 2018, which is incorporated herein by reference.

BACKGROUND

A file system, or filesystem, is used to control how data is stored and retrieved in computing. By separating the data into pieces and giving each piece a name, the information is easily isolated and identified. Each group of data is called a "file," and the structure and logic rules used to manage the groups of information and their names are called a "file system." A network file system, or distributed file system, provides a file system on a server, accessed by a group of clients via a remote file access protocol. A network file system client provides the same interfaces and semantics as local files to the user, for example, mounting/unmounting, listing directories, read/write at byte boundaries, system's native permission model.

A tenant, or a top-level cloud user, is a group of cloud users, such as an organization or a school, who share a common access with specific privileges to cloud services. A sub-user is an individual entity with its own username, user identifier (ID) and credentials, under a tenant.

Commonly used network file system protocols, such as Server Message Block (SMB) and Network File System protocol, referred to only as NFS, have evolved to include user authentication and file access authorization. The SMB, also known as Common Internet File System (CIFS), is a network file system protocol mainly used for shared access to files and printers between nodes on a network, and also provides an authenticated inter-process communication mechanism. The NFS allows a user on a client computer to access files over a computer network much like local storage is accessed.

However, such protocols are mainly designed to work in an enterprise intranet and rely on a user-maintained centralized user directory to provide further sub-user authentication and access control. These protocol designs do not adequately address the heterogeneous, multi-tenant nature of a public cloud.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Methods and systems discussed herein are directed to improving user authentication and fine-grain access control by a network file system service in a multi-tenant public cloud environment, and more specifically to improving security using a two-stage user authentication and authorization process, in which a service first authenticates the top-level tenant at incoming connection, which may be a transmission control protocol (TCP) connection, and then utilizes a pass-through authentication mechanism with a central user database to authenticate a globally unique sub-user.

Key requirements of a fully managed, multi-tenant public cloud file service may be to isolate the resources subscribed by different tenants and then to control accesses from different sub-users under the same tenant. However, there may be many technical difficulties and security concerns for such a fully managed service to directly communicate with a tenant-managed user database. For example, introducing a fully managed, multi-tenant public cloud network authentication, such as Kerberos service, may not be an ideal option due to protocol compatibility difficulties with other operating systems.

One authentication/authorization approach to be used by file system services in a public cloud environment may be to provide a tenant-level authentication using standard security protocols. For example, a file storage may use the NT LAN Manager (NTLM) protocol when an SMB session is set up, with an assistance from a centralized tenant database, to confirm if the username and password of a tenant, i.e., a storage account, are correct. If the username and password were correct, there would be no further validation of sub-user credentials, and every sub-user would be treated as the top-level tenant. However, this approach would not provide fine-grain access control with sub-users and could be subject to potential attacks as authentication is solely based on tenant credentials.

Another approach may be to isolate the access of the file systems on the network layer, by using dedicated or private networks. With such an approach, each file system's mount target instance must reside in a private IP network, and only the hosts/virtual machines (VMs) in the designated private IP network are allowed to access the specified file system, while accesses from clients outside the designated private IP network are denied. While this approach may provide good isolation of file systems, it would be required to work in an environment where each file system client is within at least one dedicated or private network. In a public cloud environment, this requirement would increase the total cost of ownership and reduce the flexibility of cloud deployment, i.e., the tenant may choose to have systems running in a classic network where tenants are in the same connected network. Furthermore, for the sub-user authentication, this approach may require the tenant to maintain its own sub-user database to keep sub-user IDs consistent across the file system clients, adding costs to small tenants and the usage would be restricted to NFS protocols.

Without losing security capabilities provided by individual network file system protocols, enhanced and economic authentication and authorization in a public cloud may be provided as described below.

In a public cloud environment, modern network file systems mainly utilize the TCP as transport protocols. For example, SMB protocols support TCP, network basic input/ output system (NetBIOS) and remote direct memory access (RDMA) as transport protocols. Although, SMB clients may connect to SMB file system servers only through TCP protocol in a public cloud due to the network infrastructure limitations and usage scenarios, a connection-oriented authentication and resource authorization may still be implemented based on the connection-oriented property of the TCP.

Figure 1:
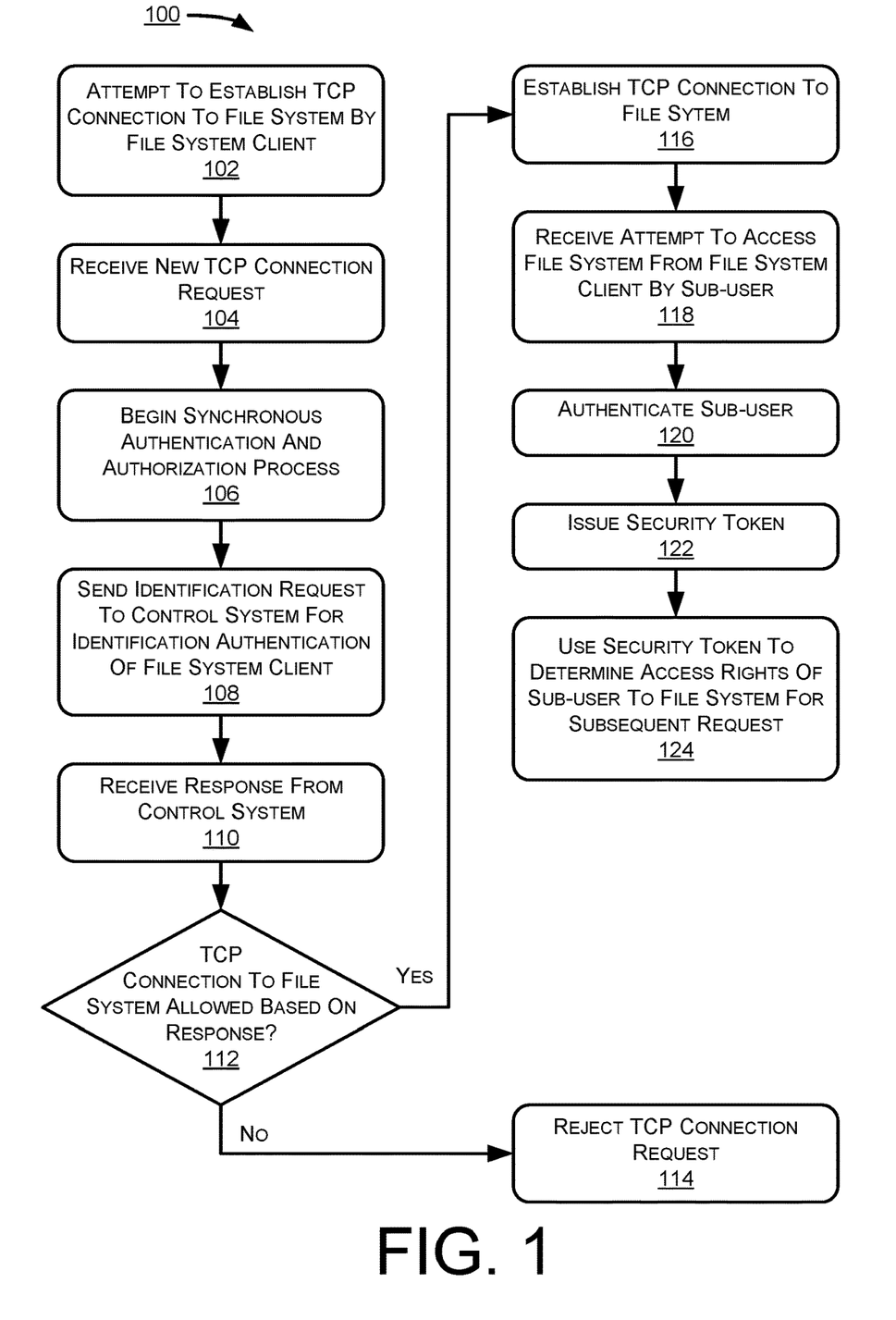
FIG. 1 illustrates an example process 100 of the TCP-connection-based tenant authentication and authorization.

FIG. 1 illustrates an example process of the TCP-connection-based tenant authentication and authorization.

At block 102, a file system client, or a tenant, may attempt to establish a connection, which may be a TCP connection, to a file system, for example, by issuing a "net use" command in the Windows operating systems (OSs) or "mount" command in the Linux OSs, to mount the file system, or when the file system server fails and the file system client switches to another server for service. Other examples may include 1) when a file system is deleted or the access control policies of the file system is changed or updated, the existing connections from file system clients accessing the deleted/updated file system may be closed by the file system server, and may result in the reconnect requests from these file system clients, and 2) when a malicious attacker constructs file system protocol data packets, then creates a TCP connection to the file server with an attempt to gain access to a file system owned by others.

Upon receiving a new TCP connection request, i.e., the attempt to establish a TCP connection to the file system, from the file system client at block 104, the file system server may begin a synchronous authentication and authorization process at block 106. All the communications between the file system server and the control system may be on a secure channel established with pre-negotiated session keys. When the file system server handles connection requests from file system clients, such as the requests described above, a tenant authentication followed by a file system-level authorization may be carried out to allow only authorized clients, who belong to the tenant that owns the file system, to establish TCP connections to the file system server, and block connection requests from unauthorized clients. Once this process is completed, one and only one TCP connection may be established between an authorized file system client and the file system server. All the access policies pre-defined by the owner of the file system may then be applied to the TCP connection to authorize individual file operation requests during normal operations. Additionally, authenticating upon establishing a TCP connection may increase the availability of the file system, as only the file system clients that are currently establishing connections would be affected when the authentication sub-system fails, while the clients with established TCP connections would not be affected when the authentication sub-system fails.

At block 108, the file system server may send an identification request to a control system for identification authentication of the file system client, and may receive a response to the identification request from the control system at block 110. The file system server may determine whether the TCP connection to the file system is allowed based on the response from the control system at block 112, and may reject the TCP connection request at block 114 upon determining that the TCP connection to the file system is not allowed. The response from the control system may include a decision from the control system whether to allow the TCP connection to the file system based on an identity of a current tenant owner of a source IP of the file system client. The current tenant owner may be checked in a client identification application programming interface (API), and whether a cloud tenant corresponding to the identity of the current tenant owner has access to the file system may be determined based on information associated with the cloud tenant.

Upon determining that the TCP connection to the file system is allowed at block 112, the file system server may establish the TCP connection to the file system at block 116. The file system server may notify the control system of information regarding the TCP connection including an establishment time of the TCP connection, the file system client, and the file system upon establishing the TCP connection to the file system. The file system server may receive an attempt to access the file system from the file system client by a sub-user at block 118, and may then authenticate the sub-user at block 120. The file system server may issue a security token including a globally unique sub-user identifier of the sub-user at block 122. At block 124, the file system server may use the security token to determine access rights of the sub-user to the file system for a subsequent request by the sub-user, which may include applying file-level access control policies using the security token to determine whether to allow the sub-user to access the file system for the subsequent request.

Figure 2:
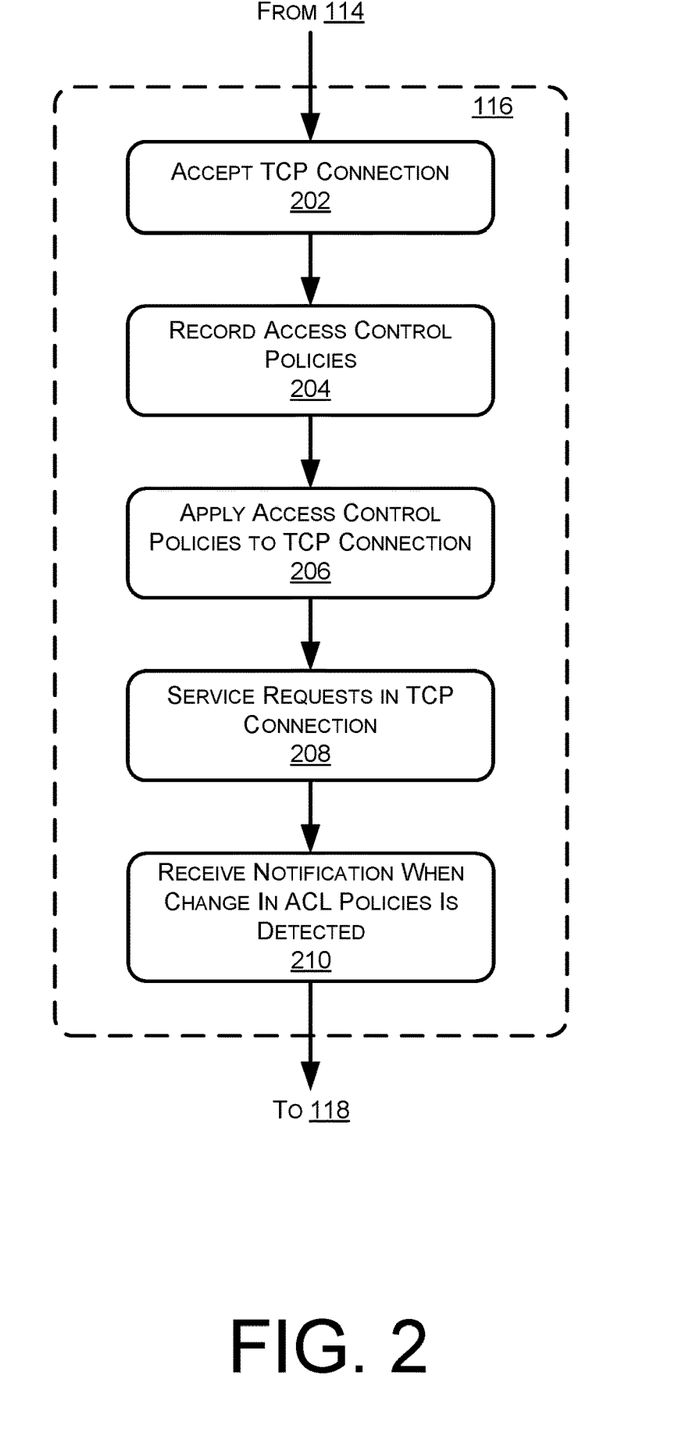
FIG. 2 illustrates an example detail of one of the blocks of FIG. 1.

FIG. 2 illustrates an example detail of establishing the TCP connection to the file system of block 116 of FIG. 1.

At block 202, the file system server may accept the TCP connection request from the file system client, and record access control policies associated with the TCP connection at block 204. The access control policies may be further associated with the source IP of the file system client to be applied to the TCP connection to the file system, and the file system server may apply the recorded access control policies to the TCP connection at block 206, and start servicing requests on the TCP connection at block 208. The file system server may also receive a notification from the control system when a change in the access control policies to the file system is detected by the control system at block 210, where the notification is sent to all file system servers connected to the file system.

Figure 3:
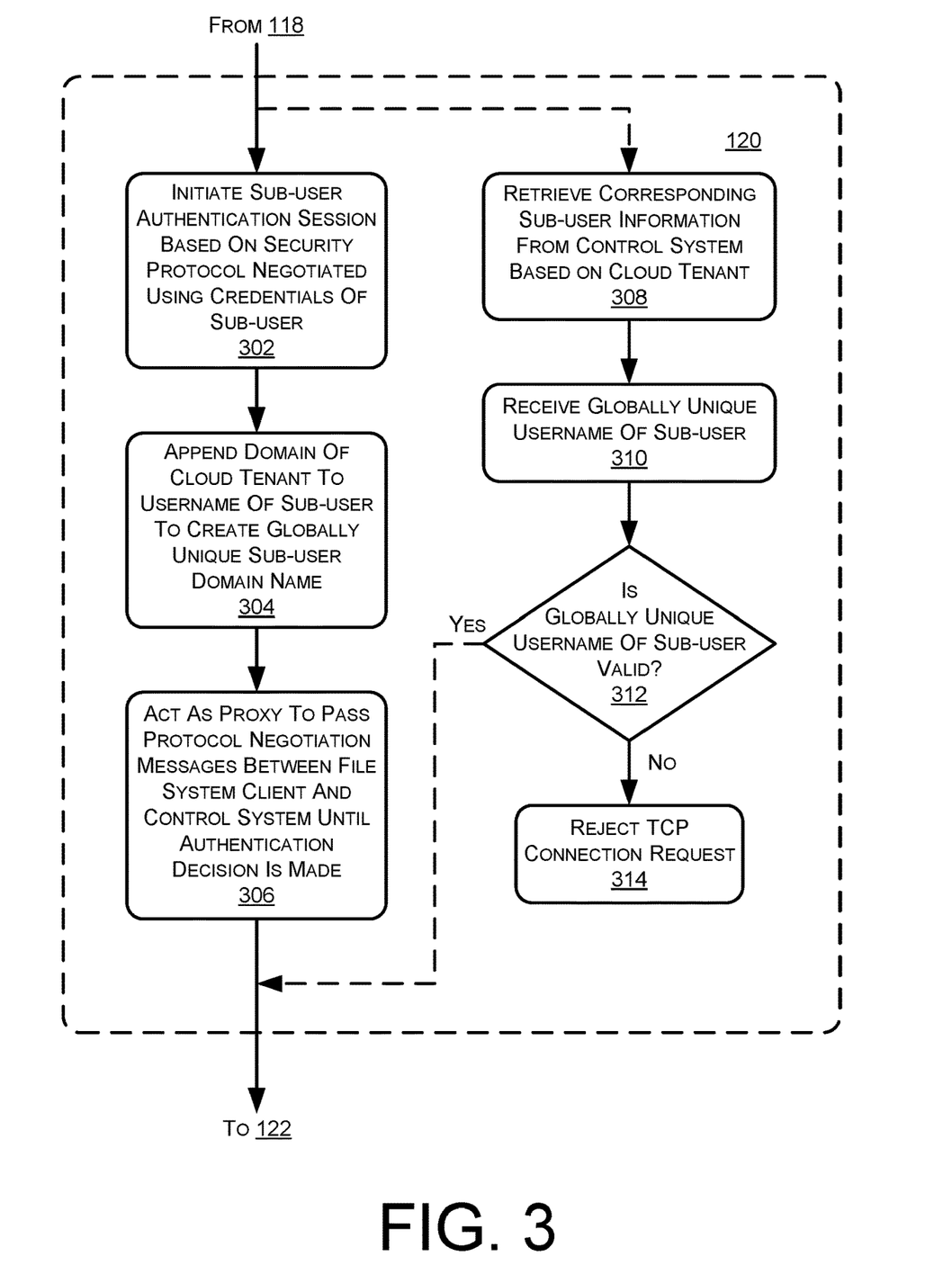
FIG. 3 illustrates an example detail of another block of FIG. 1.

FIG. 3 illustrates an example detail of authenticating the sub-user of block 120 of FIG. 1.

The file system server may initiate a sub-user authentication session based on a security protocol negotiated using credentials of the sub-user at block 302, append a domain of the cloud tenant to a username of the sub-user based on the TCP connection to create a globally unique sub-user username at block 304, and act as a proxy to pass protocol negotiation messages between the file system client and the control system until an authentication decision is made by the control system at block 306. Alternatively, the file system server may retrieve a corresponding sub-user information from the control system based on the cloud tenant at block 308, and receive a globally unique username of the sub-user at 310. At block 312, the file system server may determine whether the received globally unique username of the sub-user is valid. For example, the file system server may determine that the received globally unique username of the sub-user is invalid if the received globally unique username included at least one of an invalid domain of the cloud tenant or an invalid username of the sub-user. Upon determining that the received globally unique username of the sub-user is invalid, the file system server may reject the TCP connection request at block 314. Upon determining that the received globally unique username of the sub-user is valid, the process may proceed to block 122.

Figure 4:
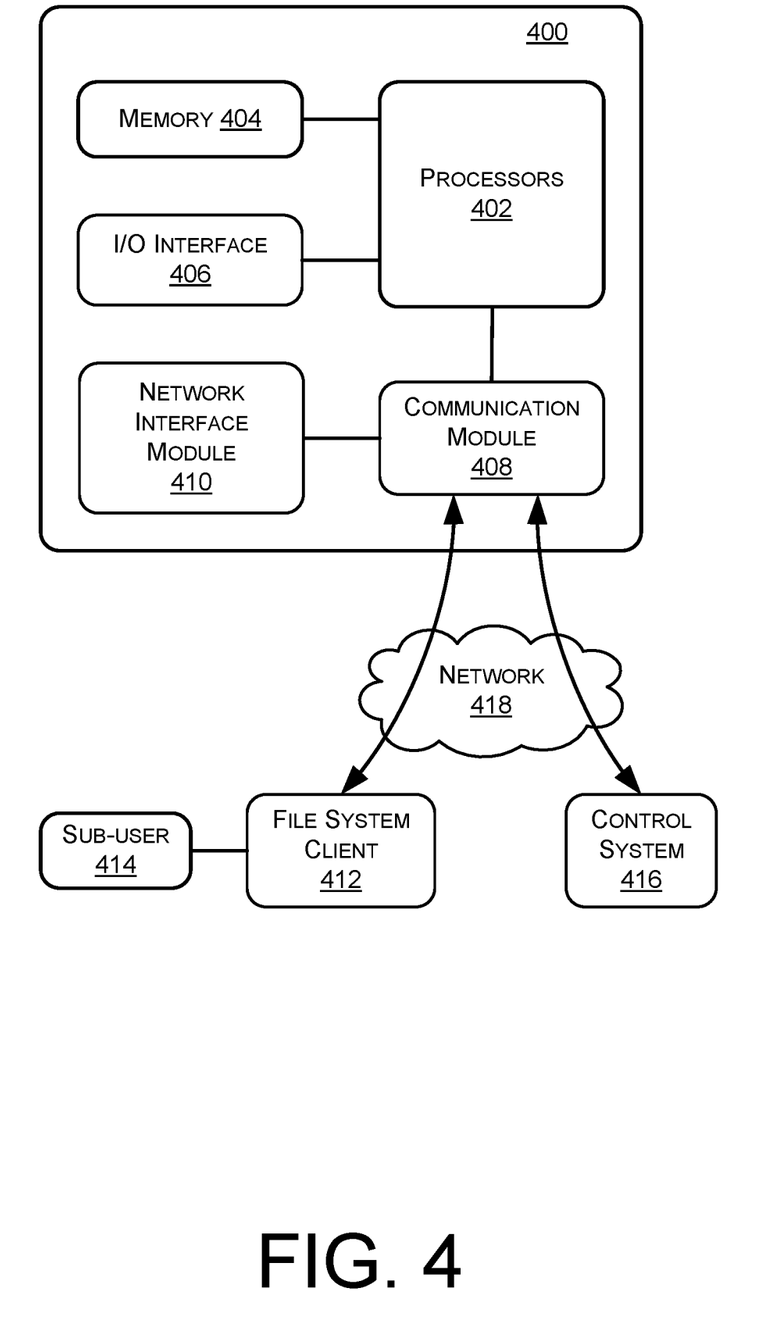
FIG. 4 illustrates an example block diagram of a file system server shown with associated components.

FIG. 4 illustrates an example block diagram of a file system server 400 shown with associated components.

The techniques and mechanisms described herein may be implemented by multiple instances of the file system server 400 as well as by any other computing device, system, and/or environment. The file system server 400 shown in FIG. 4 is only one example of a file system server and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The file system server 400 may comprise a plurality of processors 402 that are communicatively coupled to each other. The processors 402 may or may not be co-located, for example, in a distributed network or system such as a cloud computing system. Memory 404 may comprise a plurality of memory modules coupled to each other and to the processors 402. The processors 402 may execute computer executable instructions stored in the memory 402 to perform a variety of functions as described below with reference to FIGS. 1-3. The processors 602 may include a central processing CPUs, graphics processing units (GPUs), both CPUs and GPUs, or other processing units or components known in the art. Additionally, each processor of the processors 402 may possess its own local memory, which also may store program modules, program data, and/or one or more operating systems.

Depending on the exact configuration and type of the file system server 400, the memory 404 may be volatile, such as RAM, non-volatile, such as ROM, flash memory, miniature hard drive, memory card, and the like, or some combination thereof. The memory 404 may store computer-executable instructions that are executable by the processors 402.

The file system server 400 may additionally include an input/output (I/O) interface 406 for receiving data, such as user inputs, and for outputting processed data. The file system server 400 may also include a communication module 408 and a network interface module 410 allowing the file system server 400 to communicate with other device(s) or system(s), such as a file system client 412, a sub-user 414, and a control system 416, over a network 418. The network 630 may include the Internet, wired media such as a wired network or direct-wired connections, and wireless media such as acoustic, radio frequency (RF), infrared, and other wireless media.

The file system server 400, more specifically the processors 02 of the file system server 400, may execute the computer-executable instructions stored in the memory 404, and upon receiving a TCP connection from the file system client 412 via the network 418, may begin a synchronous authentication and authorization process. All the communications between the file system server 400 and the control system 416 may be on a secure channel established with pre-negotiated session keys. When the file system server 400 handles connection requests from file system clients, a tenant authentication followed by a file system-level authorization may be carried out to allow only authorized clients, who belong to the tenant that owns the file system, to establish TCP connections to the file system server 400, and block connection requests from unauthorized clients. Once this process is completed, one and only one TCP connection may be established between an authorized file system client, such as the file system client 412, and the file system server 400. All the access policies pre-defined by the owner of the file system may then be applied to the TCP connection to authorize individual file operation requests during normal operations. Additionally, authenticating upon establishing a TCP connection may increase the availability of the file system, as only the file system clients that are currently establishing connections would be affected when the authentication sub-system fails, while the clients with established TCP connections would not be affected when the authentication sub-system fails.

The file system server 400 may send an identification request to a control system, such as the control system 416, for identification authentication of the file system client 412, and may receive a response to the identification request from the control system 412. The file system server 400 may determine whether the TCP connection to the file system is allowed based on the response from the control system 416, and may reject the TCP connection request upon determining that the TCP connection to the file system is not allowed. The response from the control system 416 may include a decision from the control system 416 whether to allow the TCP connection to the file system based on an identity of a current tenant owner of a source IP of the file system client 412. The current tenant owner may be checked in a client identification application programming interface (API), and whether a cloud tenant corresponding to the identity of the current tenant owner has access to the file system may be determined.

Upon determining that the TCP connection to the file system is allowed, the file system server 400 may establish the TCP connection to the file system. The file system server 400 may notify the control system 416 of information regarding the TCP connection including an establishment time of the TCP connection, the file system client 412, and the file system upon establishing the TCP connection to the file system. The file system server 400 may receive an attempt to access the file system from the file system client 412 by a sub-user 414, and may then authenticate the sub-user. The file system server 400 may issue a security token including a globally unique sub-user identifier of the sub-user 414. The file system server 400 may use the security token to determine access rights of the sub-user 414 to the file system for a subsequent request by the sub-user 414, which may include applying file-level access control policies using the security token to determine whether to allow the sub-user 414 to access the file system for the subsequent request.

The file system server 400 may accept the TCP connection request from the file system client 412, and record access control policies associated with the TCP connection. The access control policies may be further associated with the source IP of the file system client 412 to be applied to the TCP connection to the file system, and the file system server 400 may apply the recorded access control policies to the TCP connection, and start servicing requests on the TCP connection. The file system server 400 may also receive a notification from the control system 416 when a change in the access control policies to the file system are detected by the control system 416, where the notification is sent to all file system servers connected to the file system.

The file system server 400 may initiate a sub-user authentication session based on a security protocol negotiated using credentials of the sub-user 414, append a domain of the cloud tenant to a username of the sub-user 414 based on the TCP connection to create a globally unique sub-user username, and act as a proxy to pass protocol negotiation messages between the file system client 412 and the control system 416 until an authentication decision is made by the control system 416. Alternatively, the file system server 400 may retrieve a corresponding sub-user information from the control system 416 based on the cloud tenant, and receive a globally unique username of the sub-user 414 for the TCP connection request. The file system server 400 may determine whether the received globally unique username of the sub-user 414 is valid. For example, the file system server 400 may determine that the received globally unique username of the sub-user 414 is invalid if the received globally unique username included at least one of an invalid domain of the cloud tenant or an invalid username of the sub-user 414. Upon determining that the received globally unique username of the sub-user 414 is invalid, the file system server 400 may reject the TCP connection request. Upon determining that the received globally unique username of the sub-user 414 is valid, the file system server 400 may issue the security token.

Figure 5:
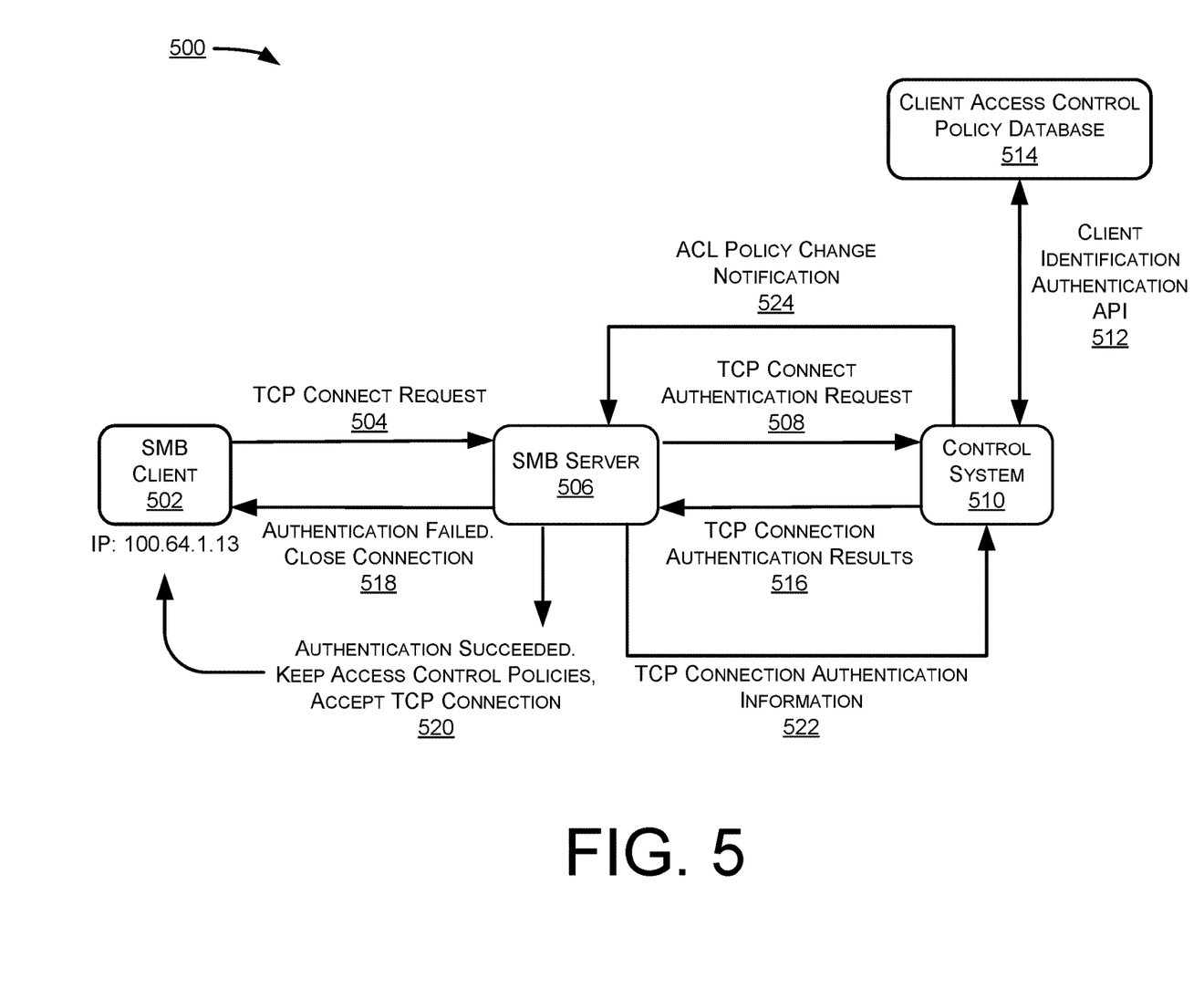
FIG. 5 illustrates an example block diagram of a file system client authentication process with the SMB.

FIG. 5 illustrates an example block diagram 500 of a file system client authentication process with the SMB.

A file system client, such as an SMB client 502, may send a TCP connection request 504 to a file system server, such as an SMB server 506. The SMB server 506 may then send a TCP connection authorization request 508 to a control system 510. The control system 510 may call a client identification authentication API 512 to check with the client access control policy database 514 whether a cloud tenant, corresponding to an identity of a current owner of a source IP of the file system client, has access to the file system. The control system 510 may then receive a response from the client access control policy database 514, and may send the TCP connection authentication result 516 to the SMB server 506. If the TCP connection authentication result 516 is negative, i.e., the SMB client 502 is not authenticated, then the SMB server 506 may close the TCP connection 518. However, if TCP connection authentication result 516 is positive, i.e., the SMB client 502 is authenticated 520, the SMB server 506 may notify 522 the control system 510, keep the access control policies, and accept the TCP connection 520, and the control system 510 may record the TCP connection information including the establishment time and information regarding the SMB 502 and the file system 522.

Figure 6:
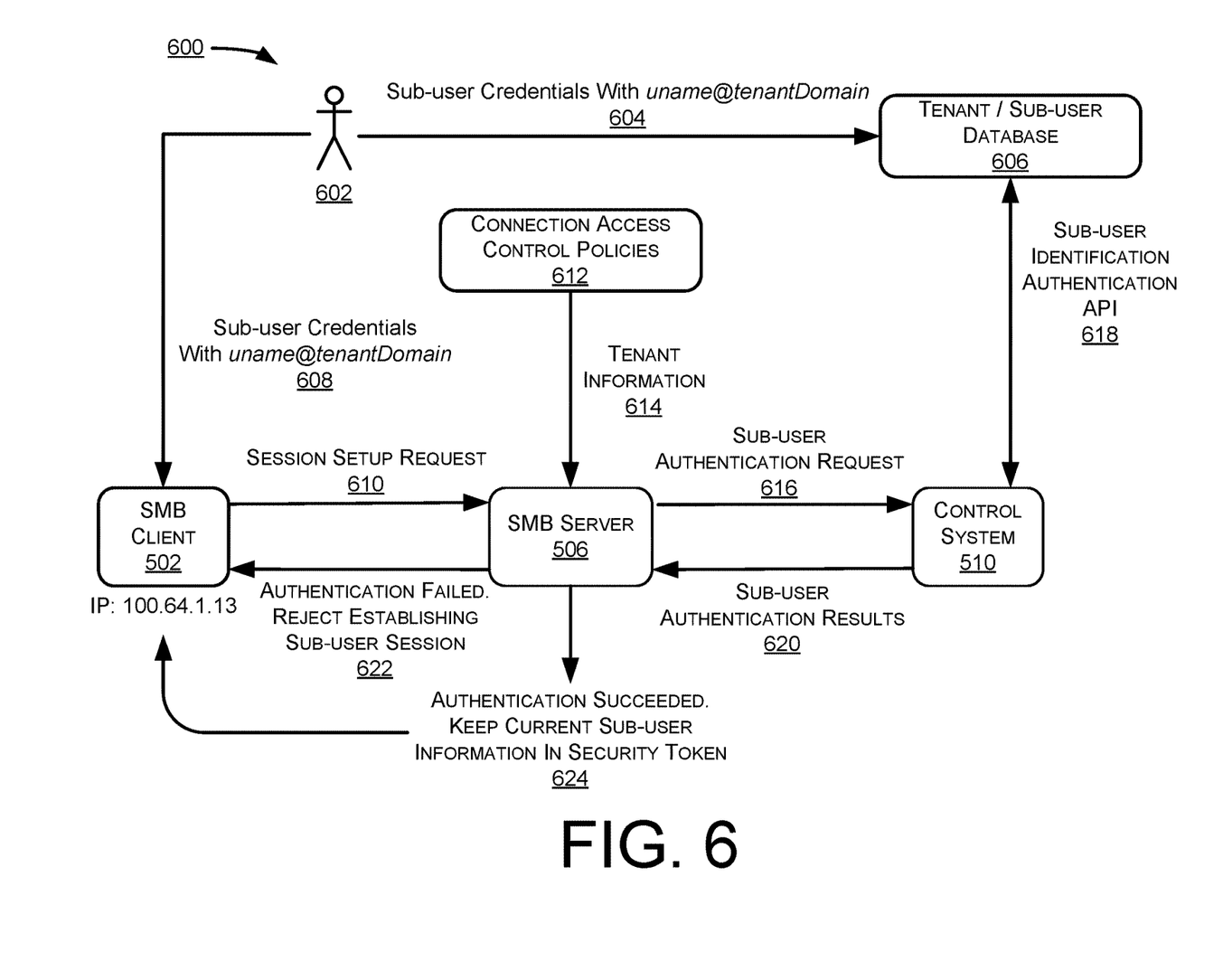
FIG. 6 illustrates an example block diagram 600 of a sub-user authentication process with the SMB after the file system client authentication.

FIG. 6 illustrates an example block diagram 600 of a sub-user authentication process with the SMB after the file system client authentication.

To access the file system, a sub-user 602 may send sub-user credentials, such as a globally unique username of the sub-user uname@tenantDomain 604 to a tenant/sub-user database 606. To establish trust, the sub-user 602 may input the sub-user's credentials 608 into the SMB client 502, and the SMB client 502 may initiate a sub-user authentication process 610 based on a security protocol using the sub-user credentials 608. The SMB server 506 may receive from connection access control policies 612 regarding tenant information 614. The SMB server 506 may append a domain name of the SMB client 502, such as "@tenantDomain," to a username of the sub-user 602, such as "uname," to obtain a globally unique sub-user username "uname@tenantDomain." Then as a trusted entity by the control system 510, the SMB server 506 acts as a proxy to pass the sub-user authentication messages between the SMB client 502 and the control system 510 until an authentication decision is made by the control system 510. For example, the SMB server 506 may send a sub-user authentication request 616 to the control system 510, and the control system 510 may call a sub-user identification authentication API 618 to check with the tenant/sub-user database 606 whether the sub-user 602 may be authenticated. The control system 510 may the pass the sub-user authentication results 620 to the SMB 506. If the sub-user authentication results are negative, i.e., the sub-user 602 is not authenticated, the SMB 506 may return ACCESS_DENIED and reject establishing the sub-user session 622. If the sub-user authentication results are positive, i.e., the sub-user 602 is authenticated, the SMB 506 may keep the current sub-user information in a security token 624.

Figure 7:
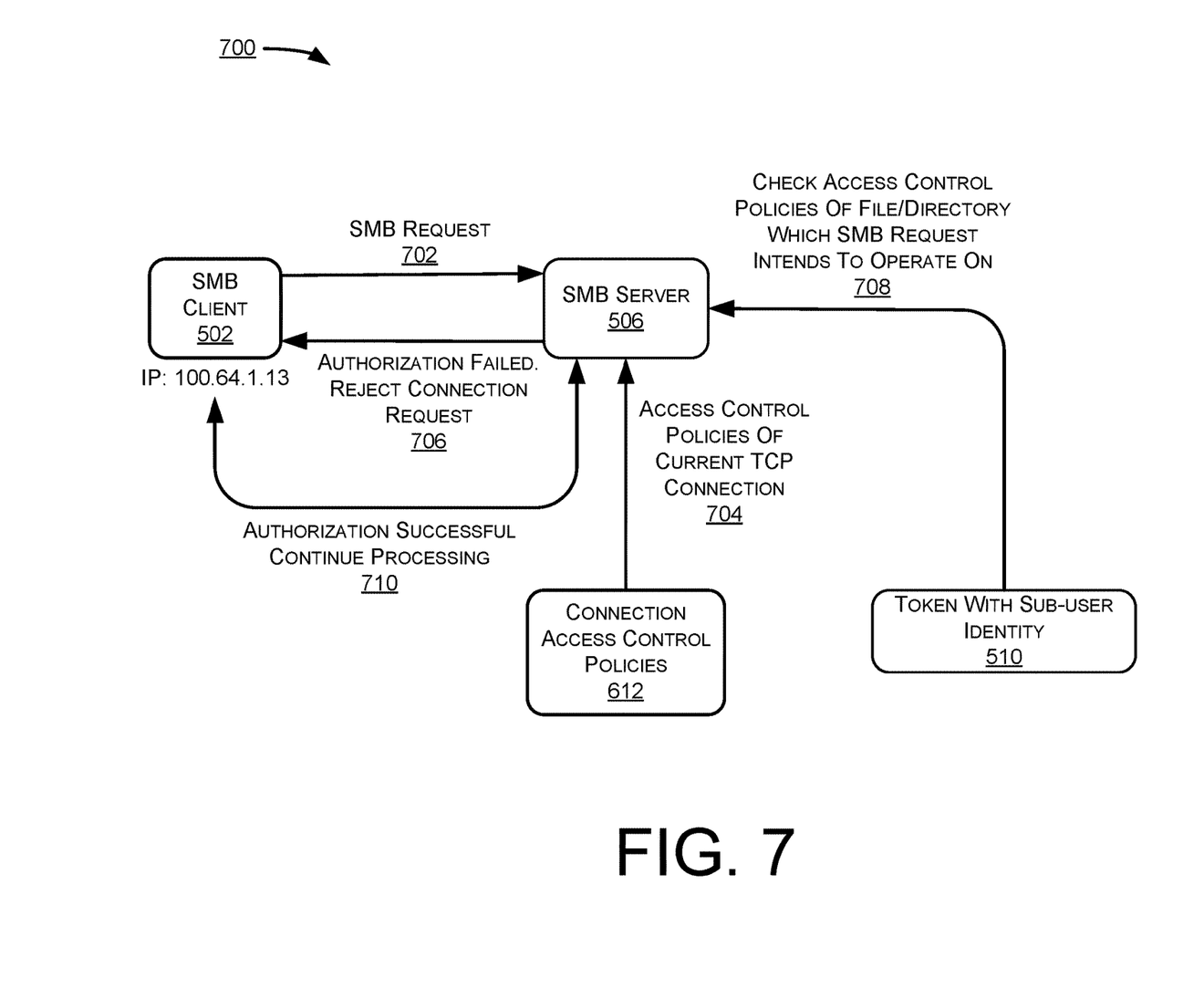
FIG. 7 illustrates an example block diagram for SMB operation authorization process.

FIG. 7 illustrates an example block diagram 700 for SMB operation authorization process.

The SMB client 502 may send an SMB request 702 to a file system to the SMB server 506. The SMB server 506 may receive access control policies of the current TCP connection 704 from the connection access control policies 612, and may determine whether to authorize the SMB request 702. Upon determining that the SMB request 702 is not authorized, the SMB server 506 may reject the SMB request 706. If the SMB request 702 is authorized, then the SMB server 506 may check the access control policies of the file/directory which the SMB request 702 intends to operate on 708 against the token with the sub-user identity 510 associated with the credentials of the sub-user. If the SMB server 506 determines that the sub-user is not authorized, the TCP connection request may be rejected 706. If the sub-user is authorized, the access to the file system, i.e., the requested TCP connection, is authorized 710, and the file SMB server 506 may continue processing 710 applying file-level access control policies using the security token 510.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. The memory 404 is an example of the computer-readable storage media. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-7. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A. A method in a file system server comprising: receiving a connection request from a file system client, the connection request being a request for a connection to a file system; sending an identification request for identification authentication of the file system client to a control system; receiving a response to the identification request from the control system; determining whether the connection to the file system is allowed based on the response; establishing the connection to the file system upon determining that the connection to the file system is allowed; receiving an attempt to access the file system from the file system client by a sub-user; authenticating the sub-user; issuing a security token including a globally unique sub-user identifier of the sub-user; and using the security token to determine access rights of the sub-user to the file system for a subsequent request by the sub-user.

B. The method as paragraph A recites, wherein the connection request is a TCP connection request, the TCP connection request being a request for a TCP connection to the file system.

C. The method as paragraph A recites, further comprising: rejecting the connection request upon determining that the connection to the file system is not allowed.

D. The method as paragraph A recites, wherein the response to the identification request from the control system includes: a decision from the control system whether to allow the connection to the file system, the decision being based on an identity of a current owner of a source IP of the file system client.

E. The method as paragraph D recites, wherein the identity of the current owner is checked in a client identification application programming interface (API) and whether a cloud tenant corresponding to the identity of the current owner has access to the file system is determined.

F. The method as paragraph E recites, wherein authenticating the sub-user comprises: initiating a sub-user authentication session based on a security protocol negotiated using credentials of the sub-user; appending a domain name of the cloud tenant to a username of the sub-user based on the connection to create a globally unique sub-user username; and acting as a proxy to pass protocol negotiation messages between the file system client and the control system until an authentication decision is made by the control system.

G. The method as paragraph E recites, wherein authenticating the sub-user comprises: retrieving a corresponding sub-user information from the control system based on the cloud tenant; and receiving a globally unique username of the sub-user for the TCP connection request.

H. The method as paragraph G recites, further comprising: rejecting the connection request upon receiving an invalid globally unique username of the sub-user, the invalid globally unique username including at least one of: an invalid domain name of the cloud tenant or an invalid username of the sub-user.

I. The method as paragraph A recites, wherein establishing the connection to the file system includes: accepting the connection request; recording access control policies associated with the connection; applying the recorded access control policies to the connection; and servicing requests on the connection.

J. The method as paragraph I recites, wherein using the security token to determine the access rights of the sub-user to the file system for a subsequent request includes: applying file-level access control policies using the security token to determine whether to allow the sub-user to access the file system for the subsequent request.

K. The method as paragraph I recites, wherein the access control policies are further associated with the source IP of the file system client to be applied to the connection to the file system.

L. The method as paragraph I recites, further comprising: receiving a notification from the control system upon detecting a change in the access control policies to the file system, wherein the notification is sent to all file system servers connected to the file system.

LM The method as paragraph A recites, further comprising: upon establishing the connection to the file system, notifying the control system of information regarding the connection including an establishment time of the connection, the file system client, and the file system.

N. A file system server comprising: one or more processors; and memory coupled to the one or more processors, the memory storing computer executable instructions executable by the one or more processors, that when executed, causes the one or more processors to perform operations comprising: receiving a connection request from a file system client, the connection request being a request for a connection to a file system; sending an identification request for identification authentication of the file system client to a control system; receiving a response to the identification request from the control system; determining whether the connection to the file system is allowed based on the response; establishing the connection to the file system upon determining that the connection to the file system is allowed; receiving an attempt to access the file system from the file system client by a sub-user; authenticating the sub-user; issuing a security token including a globally unique sub-user identifier of the sub-user; and using the security token to determine access rights of the sub-user to the file system for a subsequent request by the sub-user.

O. The file system server as paragraph N recites, wherein the connection request is a TCP connection request, the TCP connection request being a request for a TCP connection to the file system.

P. The file system server as paragraph N recites, wherein the operations further comprise: rejecting the connection request upon determining that the connection to the file system is not allowed.

Q. The file system server as paragraph N recites, wherein the response to the identification request from the control system includes: a decision from the control system whether to allow the connection to the file system, the decision being based on an identity of a current owner of a source IP of the file system client.

R. The file system server as paragraph Q recites, wherein the identity of the current owner is checked in a client identification application programming interface (API) and whether a cloud tenant corresponding to the identity of the current owner has access to the file system is determined.

S. The file system server as paragraph Q recites, wherein authenticating the sub-user comprises: initiating a sub-user authentication session based on a security protocol negotiated using credentials of the sub-user; appending a domain name of the cloud tenant to a username of the sub-user based on the connection to create a globally unique sub-user username; and acting as a proxy to pass protocol negotiation messages between the file system client and the control system until an authentication decision is made by the control system.

T. The file system server as paragraph Q recites, wherein authenticating the sub-user comprises: retrieving a corresponding sub-user information from the control system based on the cloud tenant; and receiving a globally unique username of the sub-user for the TCP connection request.

U. The file system server as paragraph T recites, wherein authenticating the sub-user further comprises: rejecting the connection request upon receiving an invalid globally unique username of the current tenant owner, the invalid globally unique username including at least one of: an invalid domain name of the cloud tenant or an invalid username of the sub-user.

V. The file system server as paragraph N recites, wherein establishing the connection to the file system includes: accepting the connection request; recording access control policies associated with the connection; applying the recorded access control policies to the connection; and servicing requests on the TCP connection.

W. The file system server as paragraph V recites, wherein using the security token to determine the access rights of the sub-user to the file system for a subsequent request includes: applying file-level access control policies using the security token to determine whether to allow the sub-user to access the file system for the subsequent request.

X. The file system server as paragraph V recites, wherein the access control policies are further associated with the source IP of the file system client to be applied to the allowed connection to the file system.

Y. The file system server as paragraph V recites, wherein the operations further comprise: receiving a notification from the control system upon detecting a change in the access control policies to the file system, wherein the notification is sent to all file system servers connected to the file system.

Z. The file system server as paragraph N recites, wherein the operations further comprise: upon establishing the connection to the file system, notifying the control system information regarding the connection including an establishment time of the connection, the file system client, and the file system.

AA. A computer readable medium storing computer-readable instructions executable by one or more processors, that when executed, causes the one or more processors to perform operations comprising: receiving a connection request from a file system client, the connection request being a request for a connection to a file system; sending an identification request for identification authentication of the file system client to a control system; receiving a response to the request from the control system; determining whether the connection to the file system is allowed based on the response; establishing the connection to the file system upon determining that the connection to the file system is allowed; receiving an attempt to access the file system from the file system client by a sub-user; authenticating the sub-user; issuing a security token including a globally unique sub-user identifier of the sub-user; and using the security token to determine access rights of the sub-user to the file system for a subsequent request by the sub-user.

AB. The computer readable medium as paragraph AA recites, wherein the connection request is a TCP connection request, the TCP connection request being a request for a TCP connection to the file system.

AC. The computer readable medium as paragraph AA recites, wherein the operations further comprise: rejecting the connection request upon determining that the connection to the file system is not allowed.

AD. The computer readable medium as paragraph AA recites, wherein the response to the identification request from the control system includes: a decision from the control system whether to allow the connection to the file system, the decision being based on an identity of a current tenant owner of a source IP of the file system client.

AE. The computer readable medium as paragraph AD recites, wherein the identity of the current tenant owner is checked in a client identification application programming interface (API) and whether a cloud tenant corresponding to the identity of the current owner has access to the file system is determined.

AF. The computer readable medium as paragraph AE recites, wherein authenticating the sub-user comprises: initiating a sub-user authentication session based on a security protocol negotiated using credentials of the sub-user; appending a domain name of the cloud tenant to a username of the sub-user based on the connection to create a globally unique sub-user username; and acting as a proxy to pass protocol negotiation messages between the file system client and the control system until an authentication decision is made by the control system.

AG. The computer readable medium as paragraph AD recites, wherein authenticating the sub-user comprises: retrieving a corresponding sub-user information from the control system based on the cloud tenant; and receiving a globally unique username of the sub-user for the connection request.

AH. The computer readable medium as paragraph AG recites, wherein authenticating the sub-user further comprises: rejecting the connection request upon receiving an invalid globally unique username of the sub-user, the invalid globally unique username including at least one of: an invalid domain name of the cloud tenant or an invalid username of the sub-user.

AI. The computer readable medium as paragraph AA recites, wherein establishing the connection to the file system includes: accepting the connection request; recording access control policies associated with the connection; applying the recorded access control policies to the connection; and servicing requests on the connection.

AJ. The computer readable medium as paragraph AI recites, wherein using the security token to determine the access rights of the sub-user to the file system for the subsequent request includes: applying file-level access control policies using the security token to determine whether to allow the sub-user to access the file system for the subsequent request.

AK. The computer readable medium as paragraph AI recites, wherein the access control policies are further associated with the source IP of the file system client to be applied to the connection to the file system.

AL. The computer readable medium as paragraph AI recites, wherein the operations further comprise: receiving a notification from the control system upon detecting a change in the access control policies to the file system, wherein the notification is sent to all file system servers connected to the file system.

AM. The computer readable medium as paragraph AA recites, wherein the operations further comprise: upon establishing the connection to the file system, notifying the control system information regarding the connection including an establishment time of the connection, the file system client, and the file system.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method in a file system server comprising:
    receiving a connection request from a file system client, the connection request being a request for a connection to a file system;
    sending an identification request for identification authentication of the file system client to a control system;
    receiving a response to the identification request from the control system;
    determining whether the connection to the file system is allowed based on the response;
    establishing the connection to the file system upon determining that the connection to the file system is allowed;
    receiving an attempt to access the file system from the file system client by a sub-user;
    authenticating the sub-user;
    issuing a security token including a globally unique sub-user identifier of the sub-user; and
    using the security token to determine access rights of the sub-user to the file system for a subsequent request by the sub-user, wherein the connection request is a transmission control protocol (TCP) connection request, the TCP connection request being a request for a TCP connection to the file system.

2. The method of claim 1, further comprising:
    rejecting the connection request upon determining that the connection to the file system is not allowed.

3. The method of claim 1, wherein the response to the identification request from the control system includes:
    a decision from the control system whether to allow the connection to the file system, the decision being based on an identity of a current owner of a source Internet Protocol (IP) of the file system client.

4. The method of claim 1, wherein establishing the connection to the file system includes:
    accepting the connection request;
    recording access control associated with the connection;
    applying the recorded access control policies to the connection; and
    servicing requests on the connection.

5. The method of claim 4, further comprising:
    receiving a notification from the control system upon detecting a change in the access control policies to the file system, wherein the notification is sent to all file system servers connected to the file system.

6. The method of claim 1, further comprising:
    upon establishing the connection to the file system, notifying the control system of information regarding the connection including an establishment time of the connection, the file system client, and the file system.

7. A file system server comprising:
    one or more processors; and
    memory coupled to the one or more processors, the memory storing computer executable instructions executable by the one or more processors, that when executed, causes the one or more processors to perform operations comprising:
        receiving a connection request from a file system client, the connection request being a request for a connection to a file system;
        sending an identification request for identification authentication of the file system client to a control system;
        receiving a response to the identification request from the control system;
        determining whether the connection to the file system is allowed based on the response;
        establishing the connection to the file system upon determining that the connection to the file system is allowed;
        receiving an attempt to access the file system from the file system client by a sub-user;
        authenticating the sub-user;
        issuing a security token including a globally unique sub-user identifier of the sub-user; and
        using the security token to determine access rights of the sub-user to the file system for a subsequent request by the sub-user, wherein the connection request is a transmission control protocol (TCP) connection request, the TCP connection request being a request for a TCP connection to the file system.

8. The file system server of claim 7, wherein the operations further comprise:
    rejecting the connection request upon determining that the connection to the file system is not allowed.

9. The file system server of claim 7, wherein the response to the identification request from the control system includes:
    a decision from the control system whether to allow the connection to the file system, the decision being based on an identity of a current owner of a source Internet Protocol (IP) of the file system client.

10. The file system server of claim 7, wherein establishing the connection to the file system includes:
    accepting the connection request;

recording access control policies associated with the connection;

applying the recorded access control policies to the connection; and servicing requests on the connection.

11. The file system server of claim 7, wherein the operations further comprise:

upon establishing the connection to the file system, notifying the control system information regarding the connection including an establishment time of the connection, the file system client, and the file system.

12. A non-transitory computer readable medium storing computer-readable instructions executable by one or more processors, that when executed, causes the one or more processors to perform operations comprising:

receiving a connection request from a file system client, the connection request being a request for a connection to a file system;

sending an identification request for identification authentication of the file system client to a control system;

receiving a response to the identification request from the control system, wherein the response to the identification request from the control system includes:

a decision from the control system whether to allow the connection to the file system, the decision being based on an identity of a current tenant owner of a source Internet Protocol (IP) of the file system client;

determining whether the connection to the file system is allowed based on the response;

establishing the connection to the file system upon determining that the connection to the file system is allowed;

receiving an attempt to access the file system from the file system client by a sub-user;

authenticating the sub-user;

issuing a security token including a globally unique sub-user identifier of the sub-user; and using the security token to determine access rights of the sub-user to the file system for a subsequent request by the sub-user.

13. The non-transitory computer readable medium of claim 12, wherein the connection request is a TCP connection request, the TCP connection request being a request for a TCP connection to the file system.

14. The non-transitory computer readable medium of claim 12, wherein the operations further comprise:

rejecting the connection request upon determining that the connection to the file system is not allowed.

15. The non-transitory computer readable medium of claim 12, wherein authenticating the sub-user comprises:

retrieving a corresponding sub-user information from the control system based on the cloud tenant; and receiving a globally unique username of the sub-user for the connection request.

16. The non-transitory computer readable medium of claim 12, wherein establishing the connection to the file system includes:

accepting the connection request;

recording access control policies associated with the connection;

applying the recorded access control policies to the connection; and servicing requests on the connection.

17. The non-transitory computer readable medium of claim 12, wherein the operations further comprise:

upon establishing the connection to the file system, notifying the control system information regarding the connection including an establishment time of the connection, the file system client, and the file system.

* * * * *